(12) United States Patent
Johnson et al.

(10) Patent No.: US 11,787,288 B2
(45) Date of Patent: Oct. 17, 2023

(54) SYSTEMS AND METHODS FOR USER INTERFACES IN A VEHICULAR ENVIRONMENT

(71) Applicant: Harman International Industries, Incorporated, Stamford, CT (US)

(72) Inventors: Jason B. Johnson, Franklin, MI (US); Timothy Raymond VanGoethem, Milford, MI (US); Alexander Efimov, Munich (DE)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 403 days.

(21) Appl. No.: 16/936,756

(22) Filed: Jul. 23, 2020

(65) Prior Publication Data

US 2021/0023946 A1 Jan. 28, 2021

Related U.S. Application Data

(60) Provisional application No. 62/878,203, filed on Jul. 24, 2019.

(51) Int. Cl.
*B60K 35/00* (2006.01)
*G06F 3/01* (2006.01)
*G06V 20/59* (2022.01)

(52) U.S. Cl.
CPC .............. *B60K 35/00* (2013.01); *G06F 3/013* (2013.01); *G06V 20/59* (2022.01);
(Continued)

(58) Field of Classification Search
CPC ................ B60K 2370/48; B60K 35/00; B60K 2370/111; B60K 2370/115; B60K 2370/1438; B60K 2370/15; B60K 2370/1529; B60K 2370/1533; B60K 2370/21; B60K 2370/27; B60K 2370/31;
(Continued)

(56) References Cited

U.S. PATENT DOCUMENTS

| 5,130,794 A * | 7/1992 | Ritchey .................. H04N 13/38 348/E13.052 |
| 10,665,140 B1 * | 5/2020 | Ahn ....................... B60Q 1/543 |

(Continued)

FOREIGN PATENT DOCUMENTS

| DE | 102008010372 B3 | 4/2009 |
| DE | 102011109564 A1 | 2/2013 |

(Continued)

*Primary Examiner* — Christopher E Leiby
(74) *Attorney, Agent, or Firm* — McCoy Russell LLP

(57) ABSTRACT

Examples are disclosed for systems and methods for user interfaces of a vehicular environment, especially for autonomous vehicles wherein an orientation or attention of the vehicle occupants is not constrained to a direction of motion. In one embodiment, a system for providing visualizations within a vehicular environment comprises at least one touch-sensitive display device positioned adjacent to at least one seat within the vehicular environment and configured to display the visualizations to an occupant of the at least one seat, the at least one touch-sensitive display device moveable from a first position in front of the seat to a second position at an interior wall of the vehicular environment.

10 Claims, 11 Drawing Sheets

(52) U.S. Cl.
CPC ... *B60K 2370/111* (2019.05); *B60K 2370/115* (2019.05); *B60K 2370/1438* (2019.05); *B60K 2370/15* (2019.05); *B60K 2370/1529* (2019.05); *B60K 2370/1533* (2019.05); *B60K 2370/21* (2019.05); *B60K 2370/27* (2019.05); *B60K 2370/31* (2019.05); *B60K 2370/48* (2019.05); *B60K 2370/67* (2019.05); *B60K 2370/744* (2019.05); *B60K 2370/80* (2019.05)

(58) Field of Classification Search
CPC .......... B60K 2370/67; B60K 2370/744; B60K 2370/80; B60K 2370/1434; B60K 2370/1531; B60K 2370/164; B60K 2370/175; B60K 2370/177; B60K 2370/29; B60K 2370/334; B60K 2370/771; B60K 2370/774; B60K 2370/785; B60K 2370/794; G06F 3/013; G06F 3/011; G06F 3/04815; G06F 3/0482; G06F 3/04847; G06F 3/04883; G06F 2203/0339; G06F 1/1639; G06F 1/1652; G06F 1/1692; G06V 20/59; G06V 40/193; G06V 40/28
See application file for complete search history.

(56) References Cited

U.S. PATENT DOCUMENTS

| | | | |
|---|---|---|---|
| 2010/0214795 | A1 | 8/2010 | Salter et al. |
| 2013/0083291 | A1* | 4/2013 | Smithwick ........... G02B 5/0257 353/7 |
| 2013/0144521 | A1 | 6/2013 | Mathieu et al. |
| 2017/0217290 | A1 | 8/2017 | Yoshizumi et al. |
| 2017/0313248 | A1* | 11/2017 | Kothari ..................... B60R 1/00 |
| 2017/0349098 | A1 | 12/2017 | Uhm |
| 2019/0208136 | A1* | 7/2019 | Wendel .............. H04N 5/23232 |
| 2020/0036948 | A1* | 1/2020 | Song ................. B60W 50/0097 |
| 2020/0290567 | A1* | 9/2020 | Funyak .................. B60R 25/34 |
| 2021/0323576 | A1* | 10/2021 | Hwang ................. B60K 35/00 |
| 2022/0144172 | A1* | 5/2022 | Fukuma ................. G06F 3/013 |

FOREIGN PATENT DOCUMENTS

| | | |
|---|---|---|
| DE | 102013021928 A1 | 6/2015 |
| DE | 102015011403 A1 | 3/2017 |
| DE | 102016213688 A1 | 2/2018 |
| DE | 102016225402 A1 | 6/2018 |
| DE | 102017208028 A1 | 11/2018 |
| DE | 102018205805 A1 | 10/2019 |
| WO | 2018140000 A1 | 8/2018 |
| WO | 20108140000 A1 | 8/2018 |

* cited by examiner

SYSTEMS AND METHODS FOR USER INTERFACES IN A VEHICULAR ENVIRONMENT

CROSS REFERENCE TO RELATED APPLICATIONS

The present application claims priority to U.S. Provisional Application No. 62/878,203, entitled "SYSTEMS AND METHODS FOR USER INTERFACES IN A VEHICULAR ENVIRONMENT", and filed on Jul. 24, 2019. The entire contents of the above-listed application are hereby incorporated by reference for all purposes.

TECHNICAL FIELD

The disclosure relates to an in-vehicle interface system and associated controls.

BACKGROUND

Vehicles may include an in-vehicle computing system, such as a head unit for an infotainment system, which may provide multimedia and control functions. For example, an in-vehicle computing system may provide navigational, multimedia playback, telephonic, social media interactive, mobile device charging, and/or other functions and receive user input to control elements of the vehicle and in-vehicle computing system. Typically, controls for the in-vehicle computing system and display devices of the in-vehicle computing system are configured in a fixed position at a dashboard of the vehicle.

SUMMARY

In order to provide enhanced interactions with an in-vehicle computing system, especially for autonomous vehicles wherein an orientation of the vehicle occupants is not constrained to a direction of motion, various embodiments are disclosed for user interfaces (UIs) for vehicular environments. An example system for providing visualizations and user controls within a vehicular environment comprises at least one bendable touch-sensitive display device positioned adjacent to at least one seat within the vehicular environment and configured to display the visualizations to an occupant of the at least one seat, the at least one bendable touch-sensitive display device bendable from a first position in front of the seat to a second position at an interior wall of the vehicular environment.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
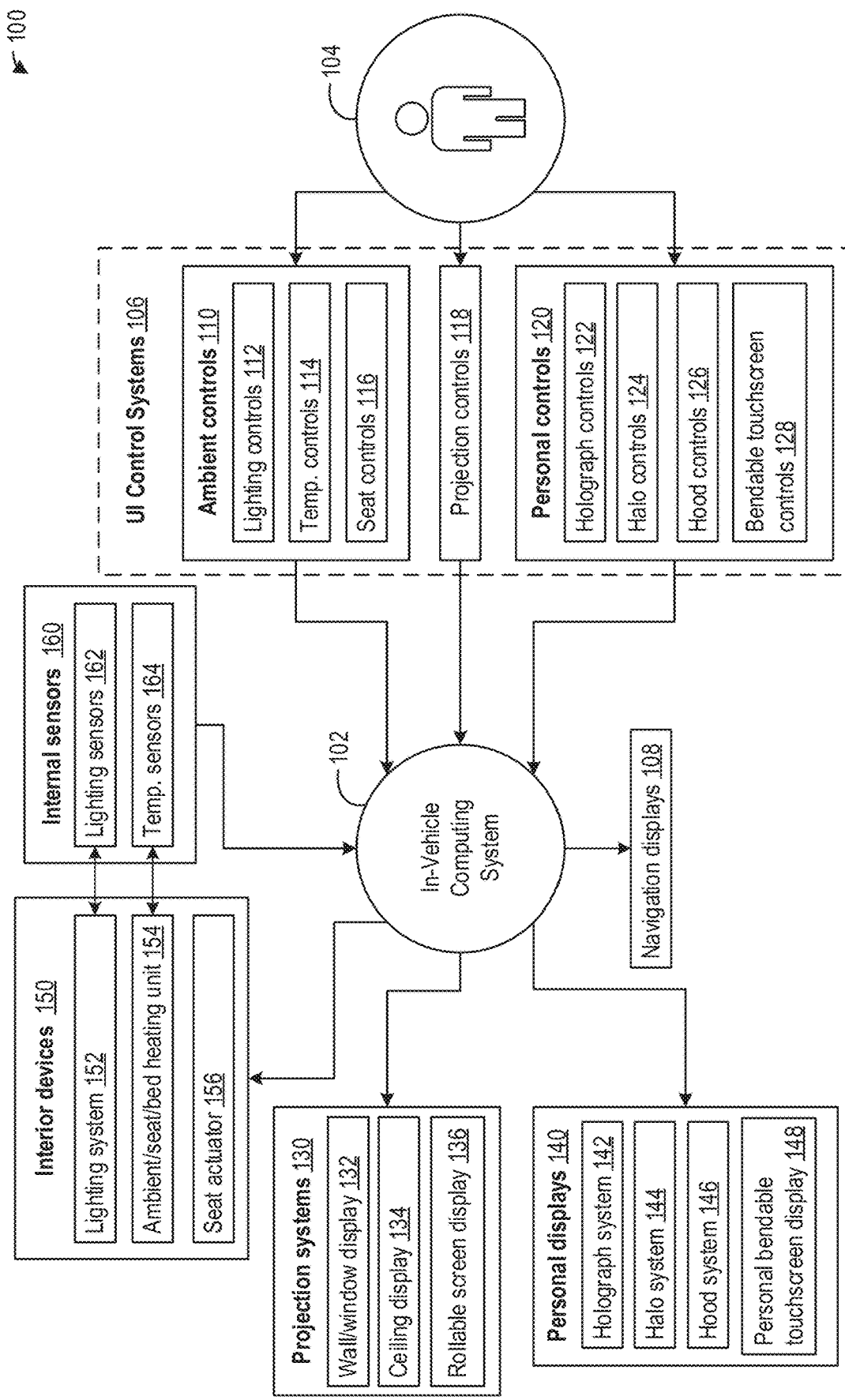
FIG. 1 is a block diagram of a UI system for a vehicular environment.

Referring to FIG. 1, a block diagram of vehicular environment user interface (UI) system 100 is shown. The UI system 100 may be installed in a cabin of a vehicle (not depicted in FIG. 1). The vehicle of FIG. 1, as well as other vehicles referred to herein, may be a motor vehicle including drive wheels and/or an internal combustion engine, as an illustrative example. The vehicle may be a road automobile, truck, bus, or van, among other types of vehicles. In some examples, the vehicle may include a hybrid propulsion system including an energy conversion device operable to absorb energy from vehicle motion and/or the engine and convert the absorbed energy to an energy form suitable for storage by an energy storage device. The vehicle may be a fully electric vehicle, incorporating fuel cells, solar energy capturing elements, and/or other energy storage systems for powering the vehicle. Further, the vehicle may comprise an autonomous vehicle configured to automatically navigate the vehicle to a destination with minimal user guidance or without user guidance. It should be appreciated that the examples included herein are for illustrative purposes and that the vehicular environment UI system 100 may be installed within a cabin of any other type of vehicle without departing from the scope of this disclosure. An example vehicle cabin is described in further detail below with respect to FIG. 2.

The UI system 100 may include an in-vehicle computing system 102, which serves data in one or more formats capable of being sensed by a passenger 104. Serving data in one or more formats capable of being sensed by the passenger 104 may include rendering images and/or videos on a display device, wall, window, screen, or other surface of a vehicle cabin; rendering audio data via a speaker system; displaying holographic images on a surface of the vehicle cabin within or within the environment of the vehicle cabin; rendering immersive video and/or audio content within a personal hood, halo, head-mounted display or similar device; rendering lights, colors, and/or augmented reality images and/or videos in conjunction with internal or external visual features of the vehicular environment, as well presenting visual and/or audio information via any other modality or in any other similar manner.

The in-vehicle computing system 102 may also be electronically coupled to one or more navigation displays 108, whereby the in-vehicle computing system 102 may be configured to display navigation information to one or more passengers 104 via a screen or touchscreen mounted within the vehicular environment (e.g., on a wall of the vehicular environment, on the floor, etc.). For example, the in-vehicle computing system 102 may display information about the current location of the vehicle within the external environment, or may notify the one or more passengers 104 of any adjustments to the velocity and/or orientation of the vehicle (e.g. that the vehicle is slowing down or speeding up, that the vehicle is preparing to turn to the right or to the left, etc.).

For the purposes of this disclosure, the in-vehicle computing system 102 is a computing system used to control the UI system 100 responsive to commands by the passenger 104, whereby other computational functions involved in operating the vehicle (e.g., controllers used in the propulsion of the vehicle, the opening of doors and windows, external communication system, etc.) remain outside the scope of the in-vehicle computing system 102. In some examples, the in-vehicle computing system 102 may be a portion of or integrated into a more comprehensive and/or existing in-vehicle computing system of a vehicle, for example, as an embedded computing system or electronic control unit (ECU). In other examples, the in-vehicle computing system 102 may be a standalone system not integrated into a computing system of a vehicle. In some embodiments, the in-vehicle computing system 102 may be connected to a Controller Area Network (CAN) of a vehicle such that the in-vehicle computing system 102 has access to sensors, computer systems, and control units of a vehicle external to the in-vehicle computing system 102.

The in-vehicle computing system 102 may include a tangible and non-transitory computer readable medium (memory) in which programming instructions are stored. As used herein, the term tangible computer readable medium is expressly defined to include various types of computer readable storage and to exclude merely propagating signals. Additionally or alternatively, the example methods and systems may be implemented using coded instruction (e.g., computer readable instructions) stored on a non-transitory computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information).

Memory and processors as referred to herein can be standalone or integrally constructed as part of various programmable devices (e.g., computers). Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include, but are not limited to RAM, ROM, EEPROM, flash memory, or any other medium which can be used to store the desired electronic format of information and which can be accessed by the processor or processors or at least a portion of a computing device.

The in-vehicle computing system 102 may be electronically coupled to one or more UI control systems 106, which may be used by the passenger 104 to control the environmental conditions of the vehicle cabin and/or a rendering of audio and/or visual information within the UI system 100. The UI control systems 106 may include arrays of physical control elements such as buttons, switches, levers, dials, etc., or the UI control systems 106 may include arrays of virtual control elements such as buttons, dials, and/or other selectable/swipeable user interface elements within a touchscreen display, or the UI control systems 106 may include a combination of physical control elements and virtual control elements. For example, in order to adjust the configuration of a seat (e.g., from an upright position to a reclined position), the passenger 104 may operate a mechanical button or lever coupled to the seat in a position accessible to his or her hand, or the passenger 104 may select a configuration from a selection of seat configurations displayed on a touchscreen display positioned proximate the seat, or the passenger 104 may swipe a finger along a virtual touchscreen element to control the reclining of the seat. Example touch screen controls are described below in greater detail in relation to FIG. 3.

The UI control system 106 may also include motion and/or position detection controls, whereby the passenger 104 may control one or more elements or characteristics of the vehicular environment by positioning a hand or other part of the body in a determined position where the hand may be sensed by a sensor. For example, the passenger 104 may control the level of internal illumination by positioning their hand such that a beam of light is obstructed, whereby moving their hand closer to the source of the beam of light may increase the internal illumination, and moving their hand further from the source of the beam of the light may decrease the internal illumination, or the passenger 104 may control the level of internal illumination by positioning their hand in a specific configuration or moving their hand in a specific manner (e.g., waving, etc.) where the configuration or movement may be sensed by an optical sensor. An example of a position-sensing control is described in further detail below in reference to FIG. 10. The UI control system 106 may further include audio and/or voice detection controls, whereby the passenger 104 may control characteristics or elements of the vehicular environment via voice commands. It should be appreciated that the examples disclosed herein are for illustrative purposes only and other types of control elements may be included without departing from the scope of this disclosure.

The control systems may include one or more ambient controls 110, which may be electronically and/or mechanically coupled to one or more interior devices 150. Further, in order to adjust the one or more of the ambient controls 110 to a commanded adjustment, the interior devices 150 may be electronically coupled to one or more internal sensors 160. As an example, the lighting of the vehicular environment may be adjusted via one or more lighting controls 112, whereby direct and/or ambient internal lighting by a lighting system 152 may be increased or decreased responsive to a commanded adjustment by the passenger 104, as described above. The in-vehicle computing system 102 may instruct the lighting system 152 to increase or decrease the ambient lighting until a threshold illumination is achieved, as determined by a lighting sensor 162.

Similarly, the temperature in the vehicular environment may be adjusted via one or more temperature controls 114, which may instruct an ambient/seat/bed heating unit 154, via the in-vehicle computing system 102, to raise or lower the temperature of the vehicular environment or elements within it. The adjustment of the temperature of the vehicular environment or elements within it to a commanded temperature may be accomplished in conjunction with one or more temperature sensors 164. The arrangement and/or configuration of seats within the cabin of the vehicle may be adjusted via one or more seat controls 116, whereby the seats of the cabin may be moved, rotated, raised, lowered, reclined, etc. responsive to commands issued by the passenger 104 by instructing the in-vehicle computing system 102 to actuate a seat actuator 156.

The UI control systems 106 may also include one or more projection controls 118, whereby the passenger 104 may direct the in-vehicle computing system 102 to project visual content via one or more projection systems 130. The projection system 130 may include a projector mounted in or on the floor, wall, ceiling, or other surface of the vehicular environment, or the projection system 130 may project visual information via a device located within the vehicular environment or mounted on an element of the vehicular environment (e.g., a seat, table, etc.). The projection system 130 may include one or more displays and/or display areas, whereby visual information may be displayed on different screens or surfaces of the vehicular environment.

Figure 8:
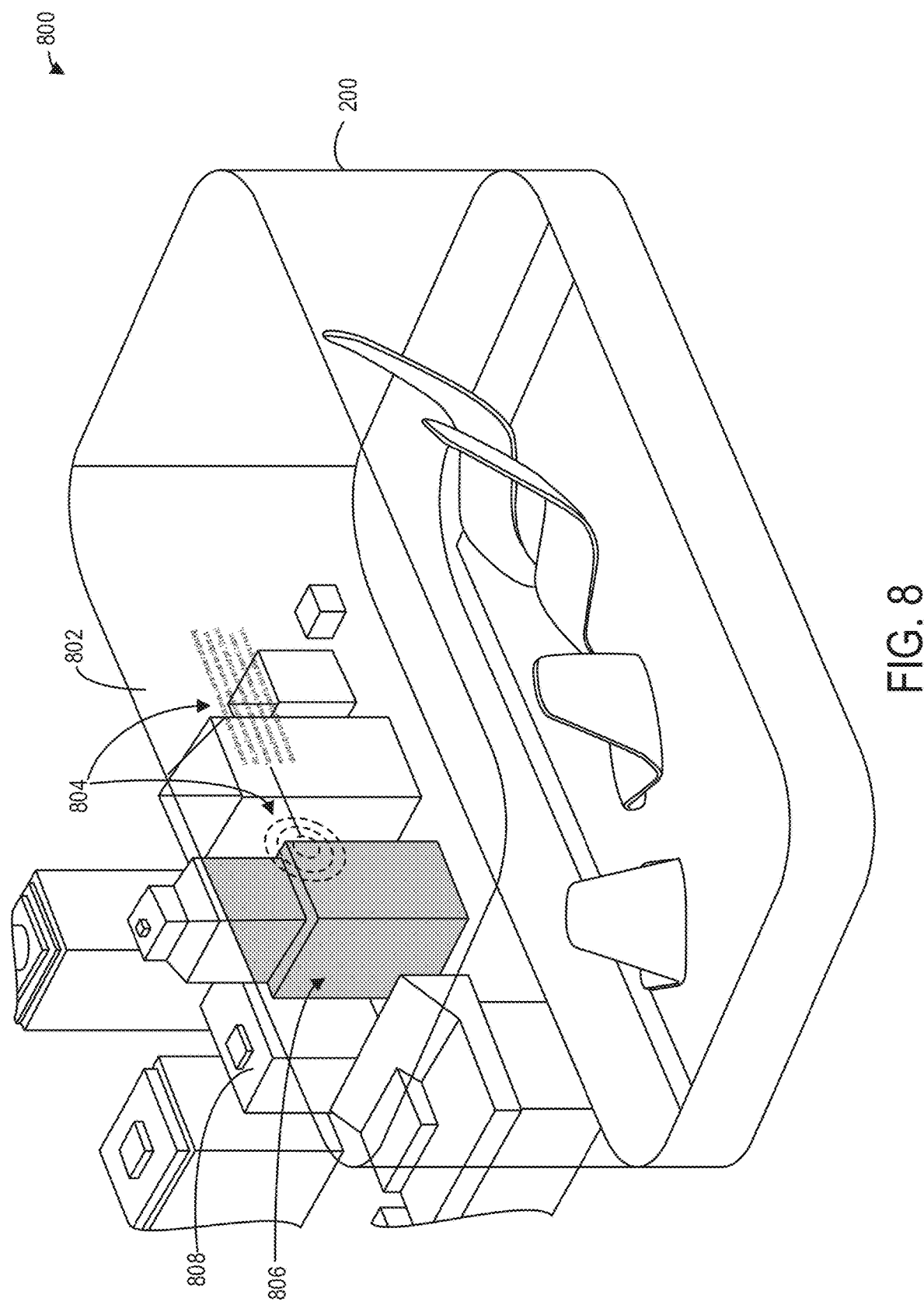
FIG. 8 is a view of a vehicular environment configured where visualizations are displayed on a window, in accordance with one or more embodiments of the present disclosure.
Figure 9:
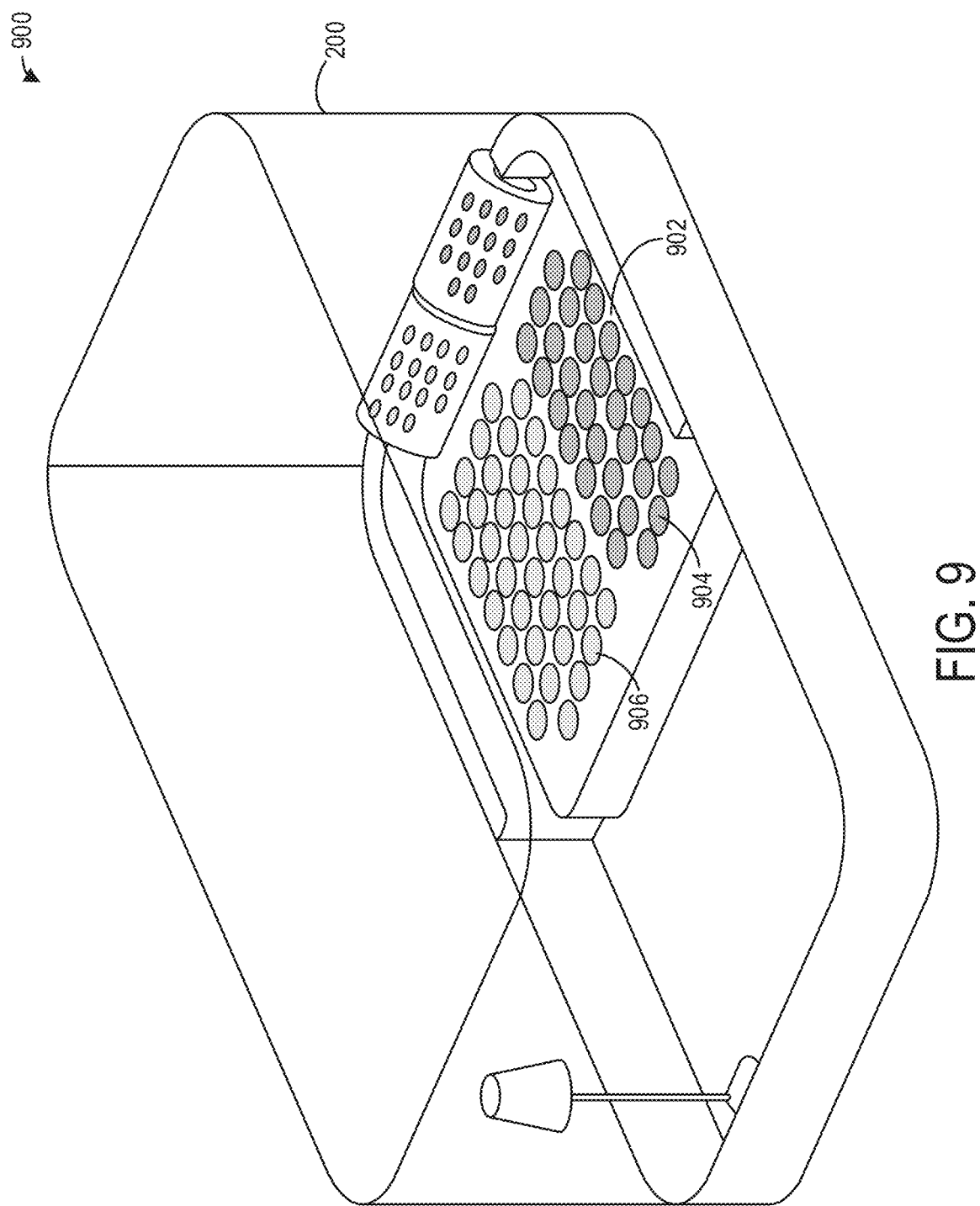
FIG. 9 is a view of a vehicular environment with visual lighting cues to indicate parameters of the environment, in accordance with one or more embodiments of the present disclosure.
Figure 10:
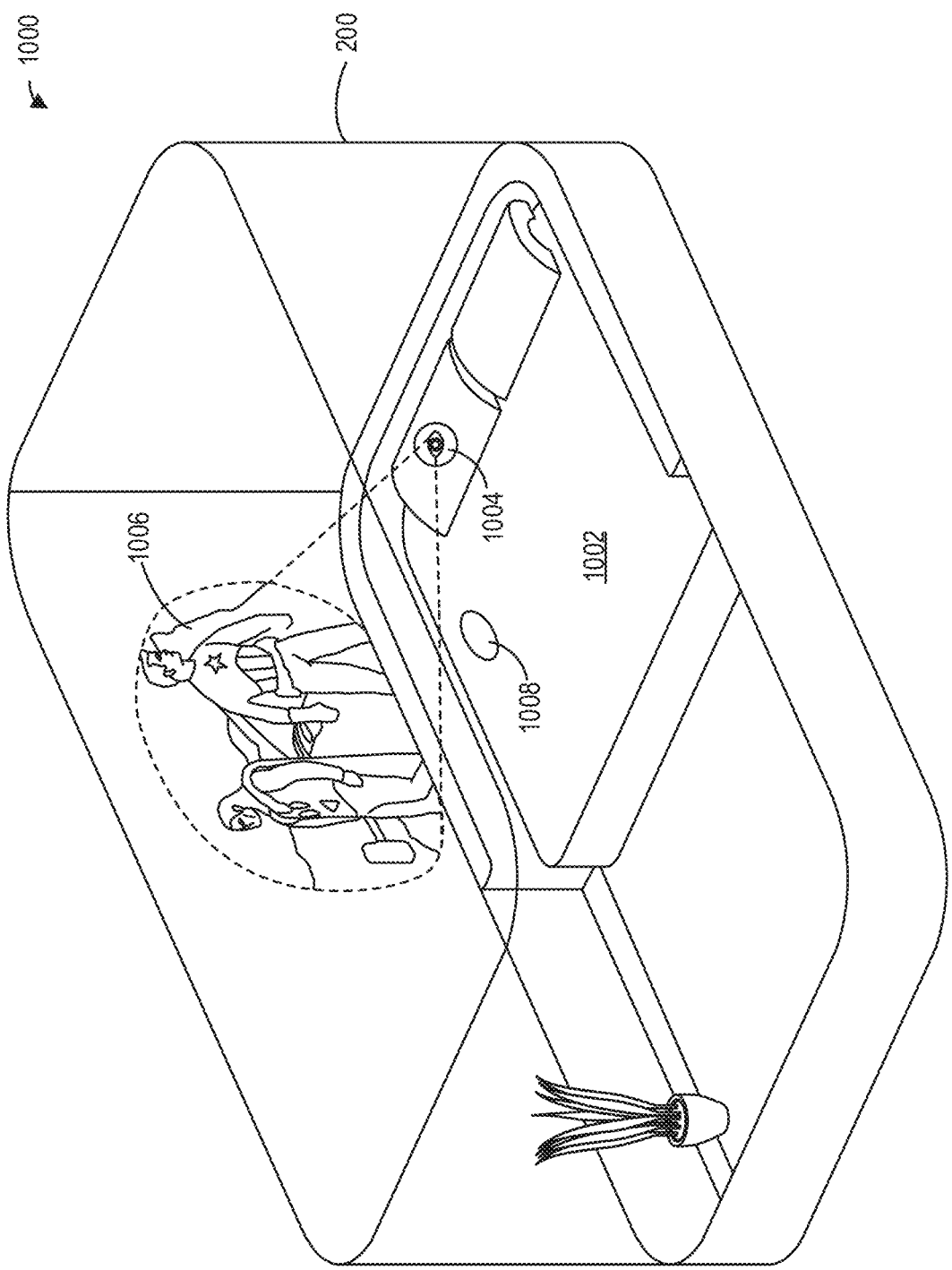
FIG. 10 is a view of a vehicular environment with gaze-linked projection, in accordance with one or more embodiments of the present disclosure.
Figure 11:
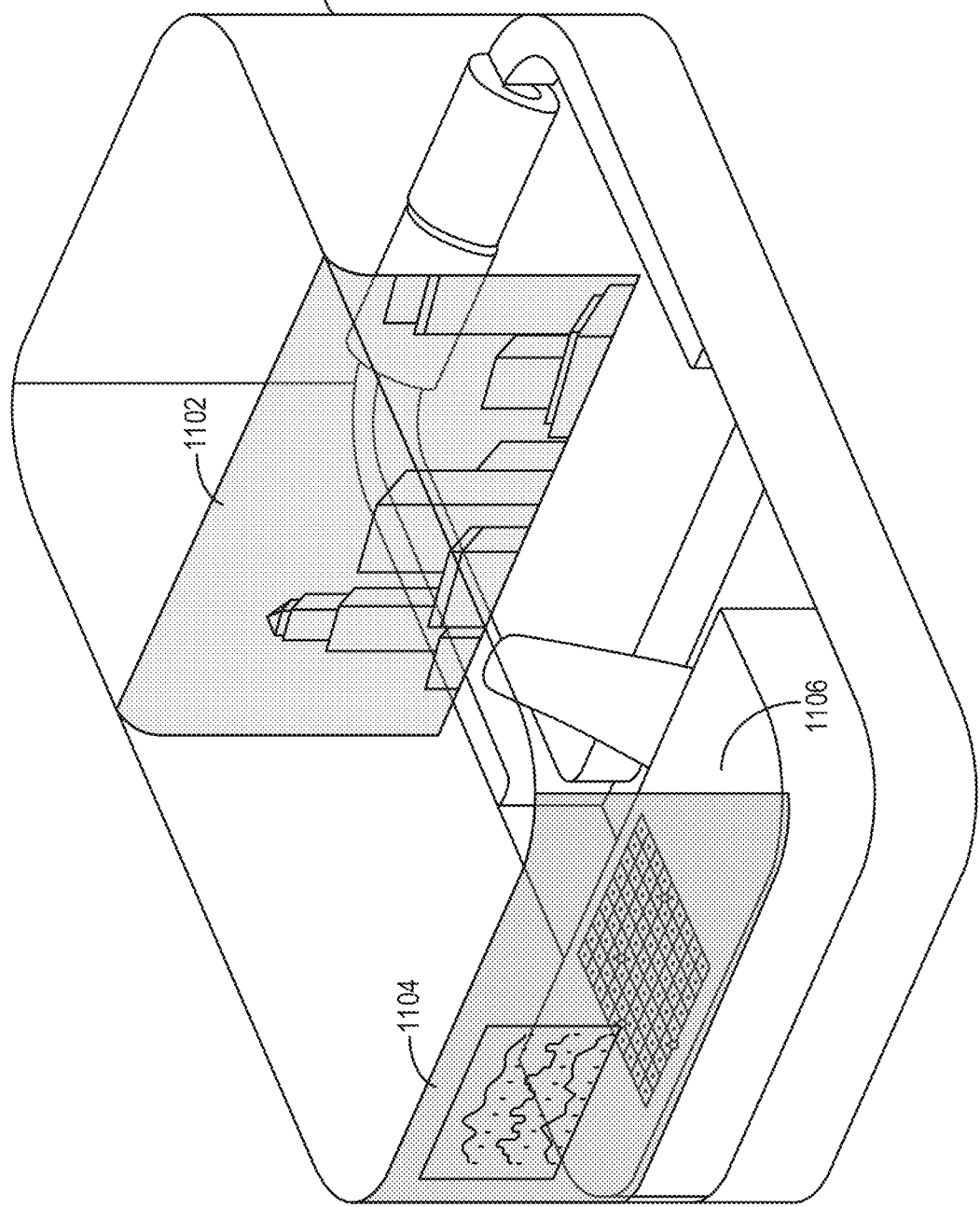
FIG. 11 is a view of an environment configured with visualizations displayed dynamically in multiple zones, in accordance with one or more embodiments of the present disclosure.

The projection system 130 may include a wall/window display 132, whereby visual content is displayed upon a vertical surface of the vehicle cabin. For example, the projection system 130 may display an informational or entertainment video on a wall of the vehicle cabin, or the projection system 130 may display images, text, or other visual information on a window of the vehicle cabin in an augmented reality display, whereby the visual information relates to, describes, and/or is positioned in accordance with elements of the visual environment positioned outside the vehicle window. Example wall/window displays 132 are described in further detail below in reference to FIGS. 8 and 10. The projection system 130 may also include a ceiling display 134, whereby images and/or video content may be displayed on the ceiling of the vehicular environment. For example, some vehicular environments may include a bed, where the passenger 104 may view the video content while lying on their back, as shown in FIGS. 9-11. The projection system 130 may also include a rollable screen display 136, whereby a projection screen may be attached to a wall or ceiling of the vehicular environment in a rolled configuration, whereby the passenger 104 may unroll the projection screen into a flat configuration upon which images or video content may be displayed. An example of the rollable screen display 136 is described in greater detail below in relation to FIG. 11.

In addition to the ambient controls 110 and the projection controls 118, the UI control systems 106 may also include one or more personal controls 120. The personal controls 120 may allow the passenger 104 to view audiovisual content on one or more personal displays 140. For the purposes of this disclosure, the personal displays 140 are displays on which personalized audiovisual content may be displayed for the consumption of an individual passenger 104, or shared consumption by one or more passengers 104 on a display system intended for an individual passenger 104.

The personal controls 120 may include one or more holographic controls 122, which may be used by a passenger 104 to instruct the in-vehicle computing system 102 to display audiovisual content via a holograph system 142. The holographic system 142 may include a projector installed on a wall, floor, or ceiling of the vehicular environment, which projects a three-dimensional holographic image in a location within the vehicular environment responsive to a command from a holographic controls 122. The holographic system 142 may also include one or more speaker systems comprising one or more speakers on which audio content may be rendered in conjunction with a holographic image displayed within the vehicular environment. An example of a holograph system 142 is discussed in further detail below in reference to FIG. 5.

Figure 7:
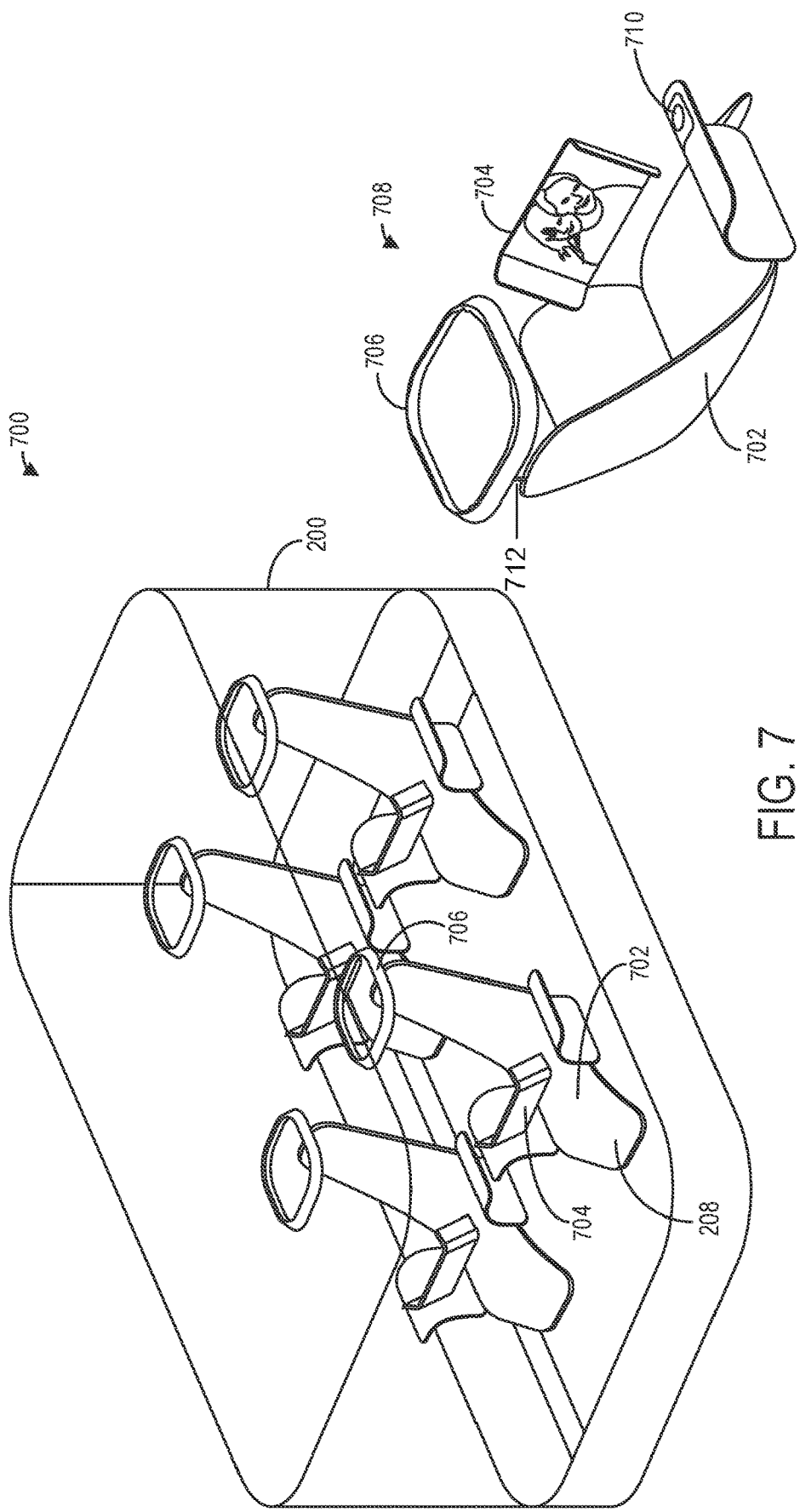
FIG. 7 is a view of a vehicular environment with individual experience seats, in accordance with one or more embodiments of the present disclosure.

The personal controls 120 may include one or more halo controls 124, which may be used by a passenger 104 to instruct the in-vehicle computing system 102 to render audio content via a halo system 144. The halo system 144 may include a speaker system positioned above and around the head of the passenger 104 (e.g., in the form of a halo), which may be mounted (such as by a mount 712, as depicted in FIG. 7) on a seat of the vehicular environment, wherein personalized audio content may be rendered. The halo system 144 may also include one or more microphones, whereby the passenger 104 may be able to issue voice commands to the in-vehicle computing system 102, or to converse with other passengers 104 or individuals external to the UI system 100. In an embodiment, the personalized audio content may include messages generated by the in-vehicle computing system 102, audio entertainment selected by the passenger 104, and/or other selectable audio data. In other embodiments, the personalized audio content may include communications with one or more individuals via a communication device (e.g., a smart phone) connected to the halo system 144. For example, a passenger 104 may connect their smart phone to the halo system 144 via an app installed on their smart phone, in order to listen to content installed on their smart phone or participate in conversations with other parties. In still further embodiments, the personalized audio content may be rendered in conjunction with personalized visual content displayable on a separate display device (e.g., a private screen). An example of the halo system 144 is described in further detail below in reference to FIG. 7.

Similarly, the personal controls 120 may include one or more hood controls 126, which may be used by a passenger 104 to instruct the in-vehicle computing system 102 to display audiovisual content via a hood system 146. The hood system 146 may include an immersive UI device, whereby immersive visual content may be displayed. In an embodiment, the immersive UI device may include a physical hood apparatus that may be positioned around the head of the passenger 104, which may be mounted on a seat of the vehicular environment, wherein video content may be displayed on a screen that may be curved to provide an expanded field-of-view. An example of the hood system 146 is described in further detail below in reference to FIG. 6. In other embodiments, the immersive UI device may include a virtual reality (VR) head-mounted display that may be attached to the passenger 104's head, wherein visual content may be displayed on separate screens for each eye to offer the passenger 104 an expanded field-of-view. The hood system 146 may also include one or more speaker systems comprising one or more speakers on which audio content may be rendered in conjunction with visual content displayed within the hood apparatus.

The personal controls 120 may include one or more personal bendable touchscreen controls 128, which may be used by a passenger 104 to instruct the in-vehicle computing system 102 to display audiovisual content on a personal bendable touchscreen display 148. The personal bendable touchscreen controls 128 and the personal bendable touchscreen display 148 may be arranged together on the same touchscreen, or the personal bendable touchscreen controls 128 may be used to display visual content on a separate personal bendable touchscreen display 148. In an embodiment, the personal bendable touchscreen display 148 and/or the personal bendable touchscreen controls 128 may be mounted on a surface or element of the vehicular environment (e.g., a wall, seat, etc.). An example of the personal bendable touchscreen display 148 is described in further detail below in reference to FIG. 4. The personal bendable touchscreen display 148 may also include one or more speaker systems comprising one or more speakers on which audio content may be rendered in conjunction with visual content displayed on the personal bendable touchscreen display 148.

Figure 2:
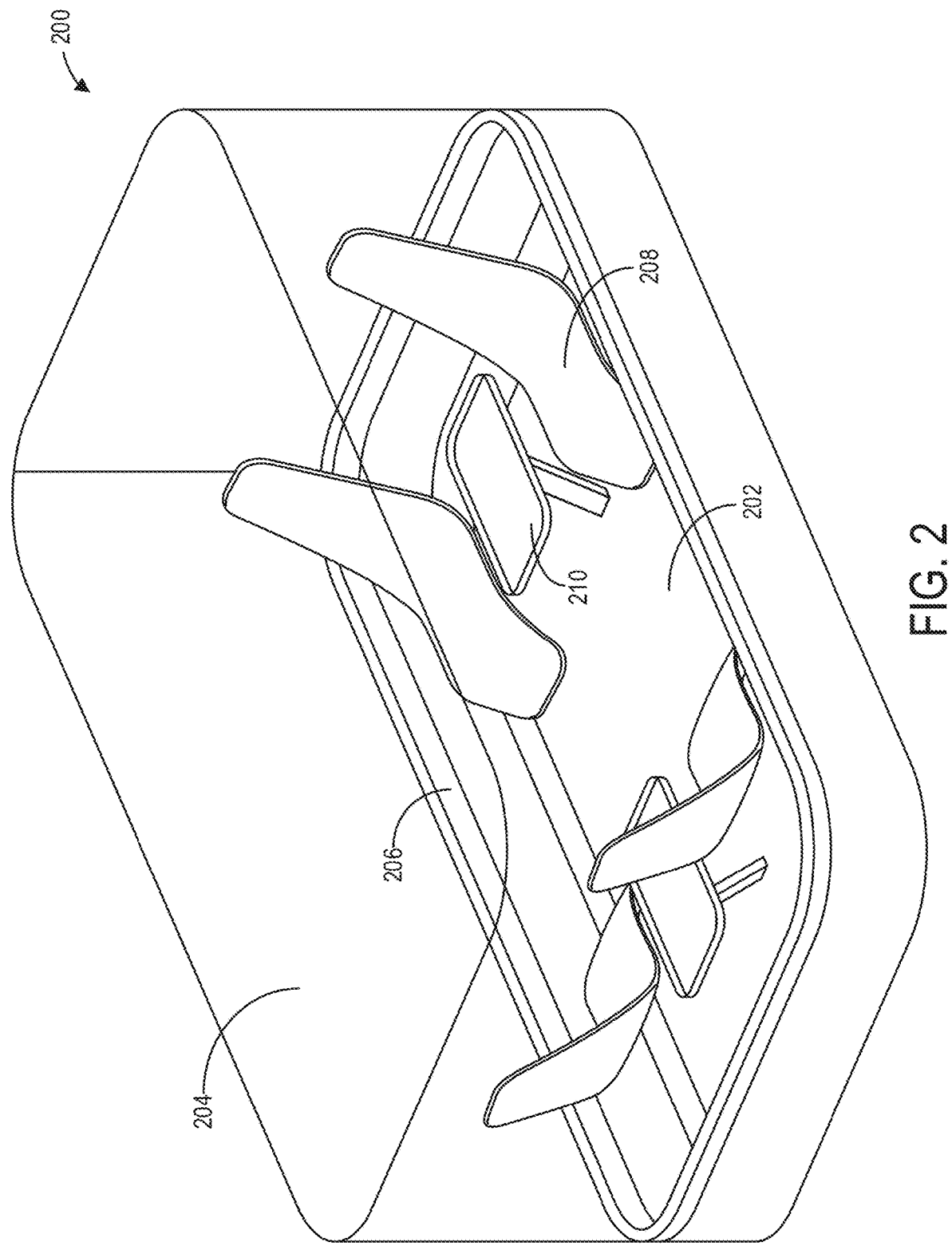
FIG. 2 is a view of a vehicular environment in the form of a vehicle cabin.

Referring now to FIG. 2, an example interior view of a cabin 200 of a vehicle is shown. The cabin 200 occupies a rectangular space on the ground plane and includes four sides. In other embodiments, the cabin 200 may occupy a square space, or a circular space, or a space of any other shape. Further, the shape and dimensions of the cabin 200 and the arrangement of elements within it are irrespective of the direction of movement of the vehicle, such that the cabin 200 may move in any direction in the ground plane regardless of the internal or external configuration of the cabin 200.

As depicted in FIGS. 2-11, the cabin 200 may include a floor 202 and walls with an upper wall section 204 and a vehicle perimeter frame 206. It should be appreciated that the upper wall section 204 and the vehicle perimeter frame 206 are included herein for illustrative purposes, and that the walls of the cabin 200 may not include an upper wall section 204 and a vehicle perimeter frame 206 and may include seamless vertical walls without departing from the scope of this disclosure.

The upper wall section 204 may be a wall comprised of an opaque material, or may include transparent or semitransparent material in the form of a window (not depicted in FIG. 2). In some embodiments, the entire upper wall section 204 may be a window, while in other embodiments a portion of the wall section 204 may be a window. The vehicle perimeter frame 206 of the cabin 200 may comprise a surface on which visual displays, UI elements, and/or devices may be attached. Examples of visual displays, UI elements, and/or devices that may be attached to the vehicle perimeter frame 206 are discussed in further detail below with respect to FIG. 3.

Figure 6:
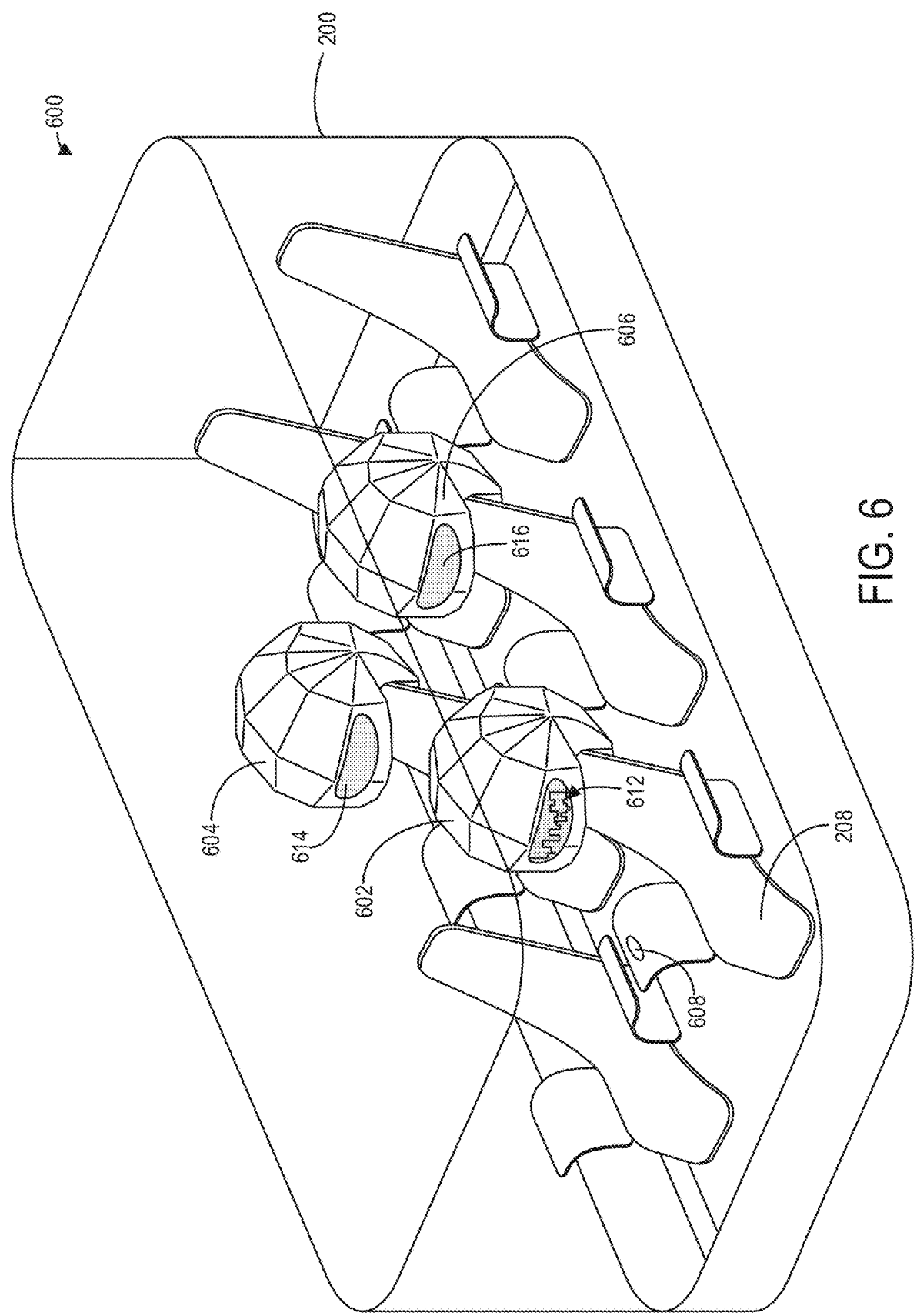
FIG. 6 is a view of a vehicular environment with individual experience hoods, in accordance with one or more embodiments of the present disclosure.

The cabin 200 may include one or more seats 208, upon which a passenger or driver may sit. The cabin 200 may also include one or more convenience tables 210, for use by a seated passenger of the vehicle. In FIG. 2, the cabin 200 is depicted with four of the one or more seats 208 facing the center of the cabin and two of the one or more convenience tables 210 arranged between the one or more seats 208. In other embodiments, the cabin 200 may include more seats or less seats, and/or more tables or less tables. The one or more seats 208 may be arranged facing the center of the cabin 200, or the one or more seats 208 may be arranged facing towards or opposite the direction of movement of the cabin 200, or the one or more seats 208 may be arranged facing any of the sides of the cabin 200. For example, cabin 200 may include six seats that are all facing the direction of movement as depicted in FIG. 6, or four seats facing one side of the cabin 200 as depicted in FIG. 8 (e.g., to look out a window and/or to view a visualization displayed upon the upper wall section 204 of a side of cabin 200), or the cabin 200 may include any other number of seats in any arrangement or combination of arrangements without departing from the scope of this disclosure. Similarly, the cabin 200 may include any number of the one or more convenience tables 210, which may be arranged between seats, or next to seats, or at any other location within the cabin 200.

The seat 208 may be of a fixed shape, or may be adjustable such that seat 208 may be reclined and/or such that the portion supporting the legs may be raised, responsive to UI controls located within the cabin 200. An example adjustment of the seat 208 is discussed in further detail below with respect to FIG. 3. Further, the seat 208 may include additional components not indicated in FIG. 2, such as armrests, personal displays, head-mounted displays, speakers, etc. Example embodiments with components such as armrests, personal displays, immersive displays, speakers, etc. are discussed in further detail below with respect to FIGS. 3-7.

In some embodiments, the cabin 200 may not include any seats and/or convenience tables, and the cabin 200 may include one or more beds (not depicted in FIG. 2), or desks (not depicted in FIG. 2), or any other type of furnishings relevant to a vehicular environment, in any type of arrangement within the cabin 200, without departing from the scope of this disclosure. Examples of embodiments with beds and desks are discussed in further detail below with respect to FIGS. 9-11.

The cabin 200 may be configured with ambient light communication. A plurality of light sources (not depicted in FIG. 2) may be distributed and integrated throughout the cabin 200 to provide ambient light. The color, brightness, color temperature, and so on, of the light sources may be dynamically adjusted to provide different psychological impacts on occupants of the cabin 200. For example, the ambient light may be configured to provide a relaxing environment (e.g., through warm color tones with lower overhead lighting and increased perimeter lighting), a productive environment for working (e.g., with cooler color tones with brighter lighting on the work plane and decreased light at the perimeter), a private or intimate environment (e.g., with low light levels, decreased perimeter lighting, and dark areas provided throughout the environment), a tense environment (e.g., through intense direct overhead lighting) and so on.

Figure 3:
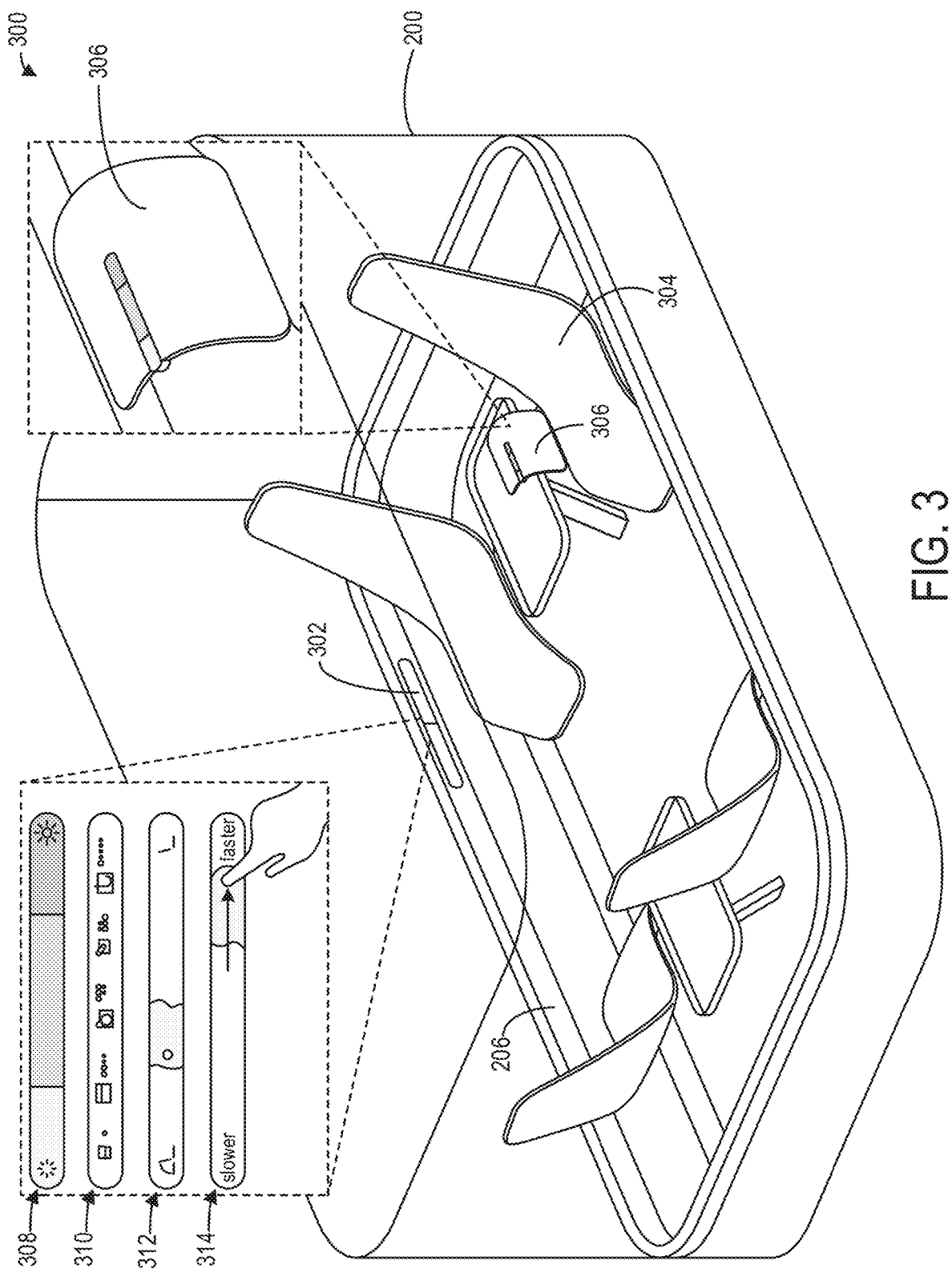
FIG. 3 is a view of a vehicular environment with a touch-sensitive display stripe, wherein a plurality of example UIs may be displayed in accordance with one or more embodiments of the present disclosure.

Referring now to FIG. 3, an example environment 300 of the cabin 200 is shown wherein users may interact with a computing system, such as the in-vehicle computing system 102 of FIG. 1, via a UI in the form of a touch-sensitive display stripe 302. One or more touch-sensitive display stripes 302 may be distributed throughout the environment 300 to provide UIs to occupants of the environment 300. For example, as depicted in FIG. 3, a display stripe 302 may be integrated into or positioned at a side panel of the vehicle body frame (e.g., the vehicle perimeter frame 206 of cabin 200 of FIG. 2), adjacent to a seat within the environment 300. Additionally or alternatively, the display stripe 302 may be integrated into an armrest 306 of a seat 304 (e.g., the seat 208 of cabin 200 of FIG. 2).

The touch-sensitive display stripe 302 may allow a user to interact with the computing system (not depicted in FIG. 3)

by swiping the user's finger along the display stripe 302. The swiping action by the user may be used to increase or decrease a parameter of the computing system. For example, via display stripe example 308 (e.g., attached to a wall of cabin 200), a user may adjust the ambient temperature of the environment 300, or via display stripe example 314, a user may adjust the vehicle driving style (e.g., the speed of the vehicle). Alternatively, via display stripe example 312 (e.g., attached to armrest 306 of seat 304), a user may adjust a configuration of the seat 304, for example, from a fully reclined position to a fully upright position or vice versa. The touch sensitive display stripe 302 may also be used to select one or more of a selection of options, where each option corresponds to a different action taken by the computing system (e.g., where the options are displayed as graphical buttons on the touch screen of display stripe 302). For example, display stripe 310 shows an embodiment of a UI for selecting one of several options for placing a coffee order, which may be available to passengers via an integrated coffee machine (not depicted in FIG. 3). Additional UIs displayable via the touch-sensitive display stripe 302 may include a UI for adjusting a depth of mixed reality immersion, a UI for adjusting individual sound volume, a UI for adjusting window opacity, a UI for adjusting aroma therapy intensity, a UI for controlling content playback (e.g., skip, pause, scroll, confirm, zoom, and so on), and a UI for providing a personal journey status (e.g., time to destination, adding/removing stops along the way to the destination, balance status of a transportation subscription, and so on).

In this way, controls for adjusting various aspects of the environment 300 may be provided to users via UI elements that share a consistent design. Further advantages of the touch sensitive display stripe 302 over other types of UI controls is that it is intuitive and easy to use, easy to see, and easy to clean.

Figure 4:
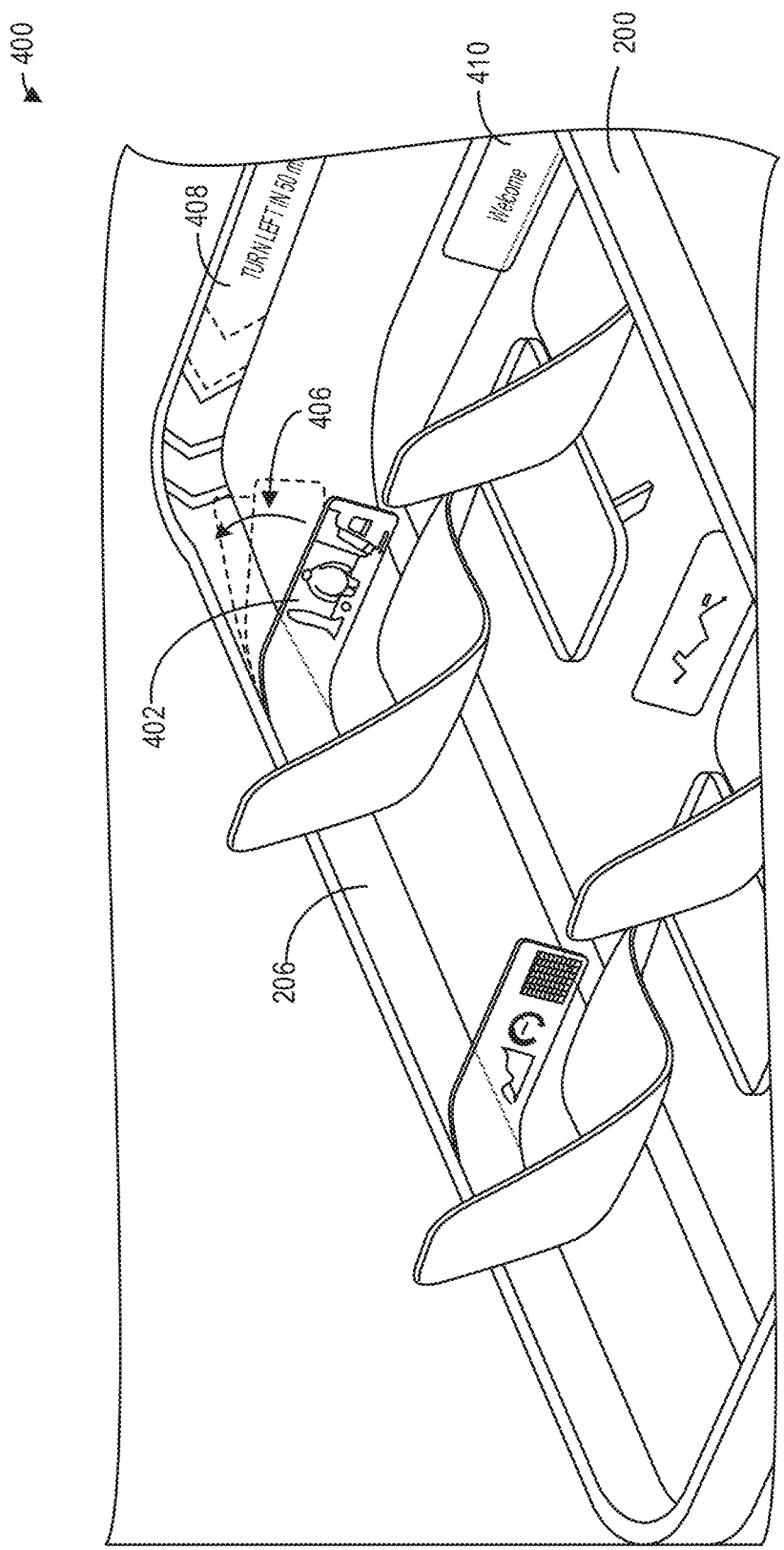
FIG. 4 is a partial view of a vehicular environment including a bendable semi-transparent touch-sensitive UI, in accordance with one or more embodiments of the present disclosure.

Referring now to FIG. 4, a portion of an example environment 400 of cabin 200 is shown wherein users may interact with a computing system, such as the in-vehicle computing system 102 of FIG. 1, via a semi-transparent touch-sensitive bendable UI 402. The bendable UI 402 may be coupled at one end to the vehicle perimeter frame 206 of cabin 200, bendable towards the vehicle perimeter frame 206 in the direction 406, such that the bendable UI 402 may be flexibly bent into a configuration for comfortably viewing the display (as shown in FIG. 4) or into a configuration against the interior wall 404 in which it is not intrusive to the passenger space, or into any other configuration within the flexibility limits of the bendable UI 402. In other embodiments, the bendable UI 402 may be coupled to portions of the seats (e.g., such as armrest 306 of seat 304 of environment 300 of FIG. 3), or coupled to car frame pillars, or any other component of the environment 400.

The bendable UI 402 may provide interactive displays of entertainment content, work content, communication content, journey and car settings controls, control extensions for mixed reality, and so on. For example, a passenger may activate the bendable UI 402 by pulling it out from the vehicle perimeter frame 206 into a configuration for comfortable viewing by a seated passenger, causing it to display a welcome screen 410 to the passenger, where touching the welcome screen may generate a list of display and/or control options for personal viewing. Thus, by providing separate UIs to each seat within the environment 400, a flexible and gentle solution for on-demand personalized visual content consumption is provided.

Additionally or alternatively, the environment 400 may include a fixed flexible UI 408 which may be coupled to the vehicle perimeter frame 206. Flexible UI 408 may be permanently coupled to the vehicle perimeter frame 206 such that flexible UI 408 bends to conform to contours of the interior wall. For example, the vehicle perimeter frame 206 may be curved in a corner between two sides of the cabin 200, and the flexible UI 408 may be coupled to the vehicle perimeter frame 206 such that the flexible UI 408 bends around the corner between the two sides of the cabin 200. In some embodiments, the flexible UI 408 may occupy a portion of the vehicle perimeter frame 206, while in other embodiments, the flexible UI 408 may occupy the entire vehicle perimeter frame 206.

The flexible UI 408 may display information to passengers in the environment 400. For example, as shown in FIG. 4, the flexible UI 408 may display a notification that the vehicle is going to turn, with an indication of the direction in which the vehicle is turning. In this way, the occupants may understand the intentions of the artificial intelligence guiding the autonomous vehicle and build trust in the autonomous journey of the vehicle.

The indication may be in the form of an arrow, a series of arrows, or similar graphical element or elements, and/or may use lights, colors, and/or combinations and/or movements of colors and/or lights to indicate the direction, speed, or other parameters of the vehicle relevant to the movement of the cabin 200. In other embodiments, the flexible UI 408 may display information relative to the location of cabin 200 within the external environment. For example, in a mass transit vehicle (e.g., a bus) the flexible UI 408 may display information about a current or upcoming bus stop, detours in the root, precautions to be taken, etc. In still further embodiments, the flexible UI 408 may display advertising content, entertainment, promotional material, or any other form of communicable information. The flexible UI 408 may also display interactive (e.g., control) elements, such as buttons, links to material, scrollable or swipable content, or may selectively display information responsive to the output of one or more sensors (not depicted in FIG. 4) located within the environment 400. For example, the flexible UI 408 may display voice-activated information in response to output from an audio sensor (e.g., microphone) located within the environment 400.

Figure 5:
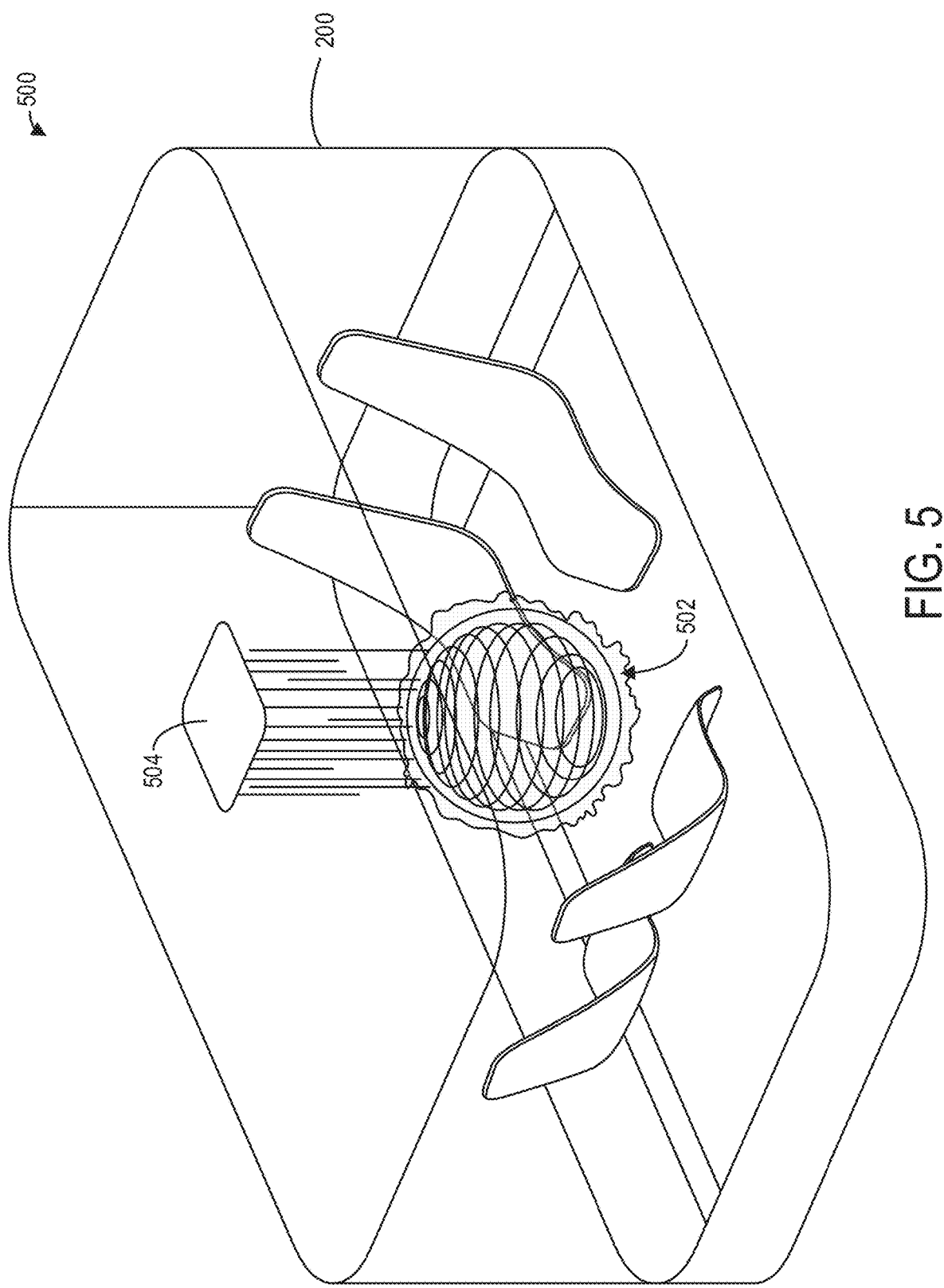
FIG. 5 is a view of a vehicular environment with a mid-air hologram with haptic feedback, in accordance with one or more embodiments of the present disclosure.

Turning now to FIG. 5, an example environment 500 of the cabin 200 of FIG. 2 is shown wherein a mid-air hologram 502 is displayed. The environment 500 may include a hologram projection unit 504 positioned at a ceiling (as depicted in FIG. 5) or on the floor 202 of the cabin 200, for example, with a projection focus point at an eye level for users seated within seats of the environment 500, for example, and/or standing within the environment 500, such that the mid-air hologram 502 may be displayed in front of users within the environment 500. The mid-air hologram 502 may display and provide controls for an artificial intelligence representation, three-dimensional maps or three-dimensional models of an object, a three-dimensional visualization of a person not physically present in the room but communicatively linked to the environment 500, one or more vehicle settings such as climate, aroma, lighting, and so on, infographic data, and so on. The mid-air hologram 502 may also provide with haptic feedback, such that users may physically interact with the mid-air hologram 502.

Turning now to FIG. 6, an example environment 600 of cabin 200 of FIG. 2 is shown, wherein one or more seats 208 of cabin 200 include individual experience hoods, such as individual experience hoods 602, 604, and 606, for creating a highly-individualized experience zone for occupants of the environment 600. For example, the head of an occupant of a seat 208 is positioned within the individual experience hood 602. The individual experience hoods 602, 604, and 606 may provide visualizations 612, 614, and 616, respectively, of a visual projection on an interior surface of the individual experience hoods 602, 604, and 606, and furthermore may provide a microclimate, air purification, noise cancellation, sound, scent generation, and so on, which are controllable by the occupant. By providing multiple individual experience hoods, as depicted, multiple occupants of the environment 600 may be provided with individualized experiences. The individual experience hoods 602, 604, and 606 may include short focus laser projections for visuals, or alternatively may include bendable display and/or control devices. Further, controls of the individual experience hoods 602, 604, and 606 may be integrated into the arm rests of the seats such as the seat 208, in the form of lighting control 608, so that a user may adjust the experience with the individual experience hood 602.

Referring now to FIG. 7, an example environment 700 of cabin 200 of FIG. 2 is shown, wherein the environment 700 includes one or more individual experience seats 702, as an alternative to the individual experience hoods of FIG. 6. The individual experience seats may also include a foldable display unit 704, and a halo unit 706. As depicted, each seat 208 of cabin 200 of FIG. 2 may be configured as an individual experience seat 702, in order to provide each occupant of the environment 700 with a highly-individual experience by sensing the occupants and interpreting their personalized feedback.

The foldable display unit 704 may provide individual content visualization, and includes curvature as depicted to maintain privacy of the depicted content. As shown in individual experience seat view 708, and similar to the bendable UI 402 of environment 400, the foldable display unit 704 may interactively display entertainment content, work content, communication content, journey and car settings controls, control extensions for mixed reality, and so on. The foldable display unit 704 may be fully folded for storage, and the individual experience seat 702 may include a designated slot for storing the foldable display unit 704 in the folded configuration. The halo unit 706 may include, as illustrative and non-limiting examples, a set of cameras to read user micro-gestures, a set of sensors to scan vital parameters of the user and the local environment, an EEG module for reading brainwaves of the user, directional audio beaming modules, microphones, and so on. The individual experience seat 702 may also include a touch control light surface 710. The touch control light surface 710 may enable the user to adjust individual content as well as control global journey and vehicle settings. The touch control light surface 710 may be integrated into the experience seat 702 or hidden under fabric of the experience seat 702, for example, and may support control input by illumination.

As mentioned above in reference to FIG. 2, some environments may include a window configured with visualizations. Referring now to FIG. 8, an example environment 800 of cabin 200 of FIG. 2 is shown configured with visualization on a window 802. The visualizations may include entertainment content (e.g., movies, games, communication), a substitution of reality (e.g., a visualization of a non-moving environment when the environment 800 is in motion, thereby minimizing the experience of motion for the occupants of the environment 800), work data, video calls with 1:1 scale of attendees and a natural "room extension/depth" effect wherein the environment 800 appears to include an additional, virtual area with the remote attendees positioned therein, and so on. The visualizations may be positioned at or integrated into any window surface of the environment 800, especially by providing the ability to have precise control over the opacity level of the windows in different zones. Accordingly, the seats of environment 800 (e.g., the seats 208 of cabin 200) may be configured in an arrangement for comfortably viewing a relevant window.

The visualizations may be provided at the window 802 by use of short focus laser projection of the visualization onto glass of the window 802. As another example, the window 802 may comprise a smart glass with inner projection to provide the visualizations. As yet another example, the window 802 may comprise a curved display instead of a transparent window, wherein visual data acquired by cameras external to the environment 800 may be displayed or projected via the window 802 to simulate the external environment around the environment 800.

In some embodiments, and as depicted in FIG. 8, environment 800 may include visualizations on the window 802 for providing augmented reality or mixed reality content. The window 802 may be transparent to allow an occupant of the environment 800 to view objects or structures 808 external to the environment 800. Further, a mixed reality projection 806 may be displayed via the window 802 to provide augmented information regarding one or more of the objects or structures 808 external to the environment 800. The mixed reality projection 806 may be generated in combination with multi-modal control layers such as voice, gestures, micro-gestures, gaze, touch surfaces, and so on. For example, the mixed reality projection 806 may be generated according to a gaze of occupants within the environment 800 as described hereinabove. The window 802 may further display additional visualizations 804 which are not depicted as occurring external to the environment 800, for example to provide additional contextual information for the mixed reality projection 806.

Referring now to FIG. 9, an example environment 900 of cabin 200 of FIG. 2 is shown, wherein the environment 900 includes a bed 902 that displays visual lighting cues to indicate parameters of the environment 900. For example, the visual lighting cues may visualize climate settings (e.g., a warm or cold surface). As an illustrative example, the environment 900 includes a first visual lighting cue 904 indicating a cold surface within the environment 900 as well as a second visual lighting cue 906 indicating a warm surface within the environment 900. In other embodiments, the visual lighting cues 904 and 906 may visualize other parameters of the environment 900, such as for example, distribution areas of aroma scents within the environment 900, or the optimal spots within the environment 900 for interacting with a mixed reality visualization system. The visual lighting cues may be positioned or integrated under an interior object's surfaces, such as under the fabric of a bed or seat within the environment 900. It should be appreciated that while the environment 900 depicts a cabin of a vehicle (e.g., cabin 200 of FIG. 2), the environment 900 may also be a stationary (i.e., non-movable) environment such as a home or office without departing from the scope of this disclosure.

Referring now to FIG. 10, another example environment 1000 of cabin 200 is shown, wherein the environment 1000 includes a bed 1002 with gaze-linked projection. It should be appreciated that bed 1002 may be the same as or similar to bed 902 of FIG. 9, and bed 1002 may also contain visual lighting cues such as first visual lighting cue 904 and second visual lighting cue 906 (not depicted in FIG. 10). Further, any of the UIs described and/or depicted herein may also be included in the environment 1000, such that the cabin 200 of FIG. 2 may include any combination of the user interfaces shown in FIGS. 2-9.

In particular, the direction of a gaze 1004 may be tracked by a camera (not shown), and as a non-limiting example, visual content 1006 may be projected onto a surface of the environment 1000 to align with the gaze 1004. That is, the visual content 1006 may naturally follow the gaze 1004 as the gaze is adjusted such that the visual content 1006 is aligned with the updated gaze 1004. In some examples, one or more focus areas may be determined within the environment 1000 such that the visual content 1006 may be projected onto the one or more focus areas.

For example, as depicted in FIG. 10, the gaze 1004 may be adjusted to view the visual content 1006 in a first position (e.g., the upper section 204 of the inner wall of cabin 200). If a user lying on bed 1002 adjusts their gaze 1004 towards the ceiling of the environment 1000, the visual content 1006 may remain in the first position until the gaze is directed toward the ceiling of the environment 1000, at which point the visual content 1006 may be projected onto the ceiling of the environment 1000. In this way, nervous movements or small adjustments to the gaze 1004 may not cause the projection of the visual content 1006 to erratically adjust within the environment 1000. The visual content 1006 may be projected onto a plurality of surfaces within the environment 1000. To project the visual content 1006 throughout the environment 1000, a plurality of short-focus laser projection sources may be distributed throughout the environment 1000. In other examples, a plurality of display panels may be distributed throughout the environment 1000, and the visual content 1006 may be displayed via one of the display panels aligned with the gaze 1004.

In some examples, the environment 1000 includes a touch control light surface 1008 to provide user controls of individual content as well as global journey and car settings. The touch control light surface 1008 may be integrated into or hidden under any surfaces and may support control input by illumination. Further, the position of the touch control light surface 1008 may be adjusted within the environment according to an adjusted position of a user within the environment, so that the touch control light surface 1008 is always within reach of the user.

Referring now to FIG. 11, an example environment 1100 of cabin 200 is shown, wherein the environment 1100 is configured with visualizations displayed dynamically in multiple zones. For example, the environment 1100 may include a rollable screen 1102 for displaying entertainment content and/or environmental projections for occupants in a given zone of the environment 1100. As depicted, the rollable screen 1102 displays visualizations in an unrolled configuration. The rollable screen 1102 is rollable into a closed, rolled configuration (e.g., when rolled towards the ceiling of the environment 1100), and in such a configuration may not display the visualizations. The environment 1100 may further include a display or projection 1104 on a window surface or wall of the environment 1100, which may include work-related content or mixed reality content, for example. The display or projection 1104 may be provided via short focus laser projections onto glass, smart glass with inner projection, curved displays instead of windows, and so on.

The environment 1100 may further include an interactive table surface 1106 which may comprise an extension of the window projection 1104 to enable control touch input and an independent interactive surface. The interactive table surface 1106 may comprise touch screens with a protective layer to function as the table surface 1106. The rollable screen 1102 may comprise an organic LCD, OLED, or another type of bendable display device.

It should be appreciated that the various systems and methods referred to herein for UIs of an environment, such as a vehicular environment, may be combined. For example, visualizations (augmented reality or otherwise) may be provided via a window of the environment, while gaze tracking allows visual content to be displayed in particular regions of the window, while other users may utilize an individual experience hood for private experiences whereas other users may utilize a mid-air hologram for a shared visual experience, all while bendable display devices depict intentions of the artificial intelligence.

Thus, various embodiments for UIs in a vehicular environment are provided. In one embodiment, a system for providing visualizations within a vehicular environment comprises at least one bendable touch-sensitive display device positioned adjacent to at least one seat within the vehicular environment and configured to display the visualizations to an occupant of the at least one seat, the at least one bendable touch-sensitive display device bendable from a first position in front of the seat to a second position at an interior wall of the vehicular environment.

In another embodiment, a system for providing visualizations within a vehicular environment comprises at least one touch-sensitive display device positioned adjacent to at least one seat within the vehicular environment and configured to display the visualizations to an occupant of the at least one seat, the at least one touch-sensitive display device moveable from a first position in front of the seat to a second position at an interior wall of the vehicular environment. In a first example of the system, the at least one touch-sensitive display device is bendable, and the at least one touch-sensitive display device is moveable via bending of the at least one touch-sensitive display device from the first position to the second position. In a second example of the system optionally including the first example, the at least one touch-sensitive display device is at least partially transparent. In a third example of the system optionally including one or more of the first and second examples, the system further comprises an in-vehicle computing system communicatively coupled to the at least one touch-sensitive display device, the in-vehicle computing system configured with executable instructions in non-transitory memory that when executed cause the in-vehicle computing system to: display, via the at least one touch-sensitive display device, a graphical user interface including the visualizations; receive, via the at least one touch-sensitive display device, user input from the occupant; and adjust one or more of the visualizations and vehicle control settings based on the user input. In a fourth example of the system optionally including one or more of the first through third examples, the system further comprises at least one camera for tracking a gaze of an occupant of the vehicular environment, and at least one display device for displaying the visualizations on a surface of the vehicular environment, wherein the at least one display device displays the visualizations on the surface when the gaze of the occupant is aligned with the surface, and wherein the at least one display device adjusts the display of the visualizations to a second surface of the vehicular environment when the gaze of the occupant is aligned with the second surface. In a fifth example of the system optionally including one or more of the first through fourth examples, the at least one display device displays the visualizations at a focus area of a plurality of focus areas defined within the vehicular environment, wherein the at least one display device does not adjust display of the visualizations away from the focus area until the gaze is closer to a second focus area of the plurality of focus areas than the focus area. In a sixth example of the system optionally including one or more of the first through fifth examples, the system further comprises a plurality of lights integrated into seating surfaces within the vehicular environment, the plurality of lights configured to indicate a location for individualized experience within the vehicular environment. In a seventh example of the system optionally including one or more of the first through sixth examples, the plurality of lights are configured to illuminate with predefined colors to indicate the individualized experience within the vehicular environment, wherein the individualized experience comprises one or more of climate settings and scent distribution.

In another embodiment, a system for providing visualizations within a vehicular environment comprises a plurality of individual experience devices, each individual experience device positioned at a corresponding seat positioned within the vehicular environment and configured to provide an individualized display of the visualizations to an occupant of the corresponding seat. In a first example of the system, each individual experience device comprises an individual experience hood positioned above the corresponding seat within the vehicular environment and configured to at least partially enclose a head of an occupant of the corresponding seat. In a second example of the system optionally including the first example, the individual experience hood is further configured to provide one or more of the individualized display of the visualizations, a microclimate within the individual experience hood, air purification, noise cancellation, sound generation, and scent generation. In a third example of the system optionally including one or more of the first and second examples, each individual experience device comprises: a halo device positioned above the corresponding seat within the vehicular environment, the halo device configured to sense parameters of the occupant of the corresponding seat; and a foldable display device positioned at the corresponding seat for displaying the individualized display of the visualizations according to one or more of the parameters sensed by the halo device. In a fourth example of the system optionally including one or more of the first through third examples, each individual experience device further comprises a touch control light surface integrated into the corresponding seat for receiving user inputs to adjust the visualizations. In a fifth example of the system optionally including one or more of the first through fourth examples, the foldable display device is bendable from a first position in front of the corresponding seat to a second position at an interior wall of the vehicular environment. In a sixth example of the system optionally including one or more of the first through fifth examples, the halo device comprises one or more of a camera adapted to acquire images of the occupant of the corresponding seat, a sensor adapted to sense one or more of vital parameters and electrophysiological measurements of the occupant of the corresponding seat, a microphone adapted to record sounds of the occupant of the corresponding seat, and a directional audio beaming module adapted to selectively output audio to the occupant of the corresponding seat. In a seventh example of the system optionally including one or more of the first through sixth examples, the system further comprises an in-vehicle computing system communicatively coupled to the plurality of individual experience devices, the in-vehicle computing device configured to evaluate signals acquired via each individual experience device associated with the occupant of the corresponding seat, and adjust at least the individualized display of the visualizations based on the evaluated signals.

In yet another embodiment, a system for providing visualizations within a vehicular environment comprises a plurality of display devices configured to provide individualized displays of the visualizations to occupants in different zones of the vehicular environment, the plurality of display devices comprising different types of display devices, and an in-vehicle computing system communicatively coupled to the plurality of display devices and configured to adjust the individualized displays of the visualizations for the occupants in the different zones of the vehicular environment. In a first example of the system, the plurality of display devices includes a first display device configured to project an individualized display of the visualizations onto a window of the vehicular environment. In a second example of the system optionally including the first example, the individualized display of the visualizations projected onto the window comprises mixed-reality content associated with structures positioned external to the vehicular environment and visible through the window of the vehicular environment. In a third example of the system optionally including one or more of the first and second examples, the plurality of display devices includes a second display device configured to display an individualized display of the visualizations, the second display device comprising a flexible screen rollable from a closed, rolled configuration to an open, unrolled configuration, wherein the second display device displays the individualized display of the visualizations when the second display device is at least partially in the open, unrolled configuration.

In another embodiment, a system for providing visualizations within a vehicular environment comprises at least one camera for tracking a gaze of an occupant of the vehicular environment, and at least one display device for displaying the visualizations on a surface of the vehicular environment, wherein the at least one display device displays the visualizations on the surface when the gaze of the occupant is aligned with the surface, and wherein the at least one display device adjusts the display of the visualizations to a second surface of the vehicular environment when the gaze of the occupant is aligned with the second surface. In one example, the at least one display device displays the visualizations at a focus area of a plurality of focus areas defined within the vehicular environment, wherein the at least one display device does not adjust display of the visualizations away from the focus area until the gaze is closer to a second focus area of the plurality of focus areas than the focus area.

In another embodiment, a system for providing visualizations within a vehicular environment comprises a hologram projection device positioned at a ceiling or a floor of the vehicular environment, the hologram projection device configured to project a hologram in mid-air of the vehicular environment at eye level for occupants of the vehicular environment.

In another embodiment, a system for providing visualizations within a vehicular environment comprises an individual experience hood positioned above a seat within the vehicular environment, the individual experience hood configured to at least partially enclose a head of an occupant of the seat, the individual experience hood configured to provide one or more of an individualized display of the visualizations, a microclimate within the individual experience hood, air purification, noise cancellation, sound generation, and scent generation.

In yet another embodiment, a system for providing visualizations within a vehicular environment comprises a halo device positioned above a seat within the vehicular environment, the halo device configured to sense parameters of an occupant of the seat, a foldable display device positioned at the seat for displaying the visualizations according to one or more of the parameters sensed by the halo device, and a touch control light surface integrated into the seat for receiving user inputs to adjust the visualizations.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the vehicle systems and cloud computing systems described above with respect to FIGS. 1-16. The methods may be performed by executing stored instructions with one or more logic devices (e.g., processors) in combination with one or more hardware elements, such as storage devices, memory, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A system for providing visualizations within a vehicular environment, comprising:
a plurality of individual experience devices, each individual experience device positioned at a corresponding seat positioned within the vehicular environment and configured to provide an individualized display of the visualizations to an occupant of the corresponding seat, wherein each individual experience device comprises:
a device formed in the shape of a halo;
the halo device positioned at and directly mounted on the corresponding seat within the vehicular environment, and positioned above and around an area for a head of a passenger in the corresponding seat; and
a foldable display device positioned at the corresponding seat for displaying the individualized display of the visualizations.

2. The system of claim 1, wherein for each individual experience device
the corresponding halo device is configured to sense parameters of the occupant of the corresponding seat; and
the individualized display of the visualizations for the corresponding foldable display device is according to one or more of the parameters sensed by the halo device.

3. The system of claim 2, wherein each individual experience device further comprises a touch control light surface integrated into the corresponding seat for receiving user inputs to adjust the visualizations.

4. The system of claim 2, wherein the foldable display device is bendable from a first position in front of the corresponding seat to a second position at an interior wall of the vehicular environment.

5. The system of claim 1, wherein the halo device comprises one or more of:
a camera adapted to acquire images of the occupant of the corresponding seat;
a sensor adapted to sense one or more of vital parameters and electrophysiological measurements of the occupant of the corresponding seat;
a microphone adapted to record sounds of the occupant of the corresponding seat; and
a directional audio beaming module adapted to selectively output audio to the occupant of the corresponding seat.

6. The system of claim 1, further comprising an in-vehicle computing system communicatively coupled to the plurality of individual experience devices, the in-vehicle computing device configured to evaluate signals acquired via each individual experience device associated with the occupant of the corresponding seat, and adjust at least the individualized display of the visualizations based on the evaluated signals.

7. The system of claim 1,
wherein the halo device comprises a speaker system by which personalized audio content may be rendered;
wherein the foldable display device comprises a screen by which personalized visual content may be rendered; and
wherein the personalized audio content is rendered in conjunction with the personalized visual content.

8. The system of claim 1, wherein the halo device comprises one or more directional audio beaming modules, and wherein the halo device renders immersive audio content.

9. The system of claim 1, wherein personalized audiovisual content is rendered within the personal halo device.

10. The system of claim 1, wherein immersive audiovisual content is rendered within the personal halo device.

* * * * *